US007822231B2

(12) United States Patent
Coimbra et al.

(10) Patent No.: US 7,822,231 B2
(45) Date of Patent: Oct. 26, 2010

(54) OPTICAL FLOW ESTIMATION METHOD

(75) Inventors: Miguel Coimbra, Vila Nova de Gaia (PT); Michael Evan Davies, London (GB)

(73) Assignee: Queen Mary and Westfield College, University of London, London (GB)

( * ) Notice: Subject to any disclaimer, the term of this patent is extended or adjusted under 35 U.S.C. 154(b) by 1294 days.

(21) Appl. No.: 10/562,604

(22) PCT Filed: Jul. 1, 2004

(86) PCT No.: PCT/EP2004/051325

§ 371 (c)(1),
(2), (4) Date: Dec. 28, 2005

(87) PCT Pub. No.: WO2005/006762

PCT Pub. Date: Jan. 20, 2005

(65) Prior Publication Data

US 2006/0188013 A1  Aug. 24, 2006

(30) Foreign Application Priority Data

Jul. 2, 2003  (GB) ................ 0315412.7

(51) Int. Cl.
G06T 7/20 (2006.01)
G06K 9/46 (2006.01)
(52) U.S. Cl. ...................... 382/107; 382/235
(58) Field of Classification Search ................ 382/107, 382/103, 173, 235, 236; 348/148, 149, 155; 375/240.16; 708/441
See application file for complete search history.

(56) References Cited

U.S. PATENT DOCUMENTS

| 5,991,428 | A | * | 11/1999 | Taniguchi | 382/107 |
| 6,366,701 | B1 | * | 4/2002 | Chalom et al. | 382/107 |
| 6,456,731 | B1 | | 9/2002 | Chiba et al. | |
| 6,643,387 | B1 | * | 11/2003 | Sethuraman et al. | 382/107 |
| 2002/0154792 | A1 | | 10/2002 | Cornog et al. | |
| 2009/0110076 | A1 | * | 4/2009 | Chen | 375/240.16 |
| 2009/0168887 | A1 | * | 7/2009 | Lin | 375/240.16 |

FOREIGN PATENT DOCUMENTS

| WO | 00/45339 A | 8/2000 |
| WO | 01/96982 A | 12/2001 |

OTHER PUBLICATIONS

International Search Report for corresponding Application No. PCT/EP2004/051325 mailed Jan. 3, 2005.

(Continued)

*Primary Examiner*—Scott A Rogers
(74) *Attorney, Agent, or Firm*—Woodcock Washburn LLP

(57) ABSTRACT

The optical flow in an image is estimated using only parameters extracted directly from a compressed video data stream, substantially eliminating the need to decode the video data stream for this purpose. Coefficients extracted from the compressed video data stream are used to establish a confidence map indicative of the edge strength within the image data and hence the accuracy of the associated motion field. A smooth motion field is generated from the motion vectors inherent in the compressed video data stream. The motion field is then used to update the confidence map between frames, providing an estimate of the optical flow.

23 Claims, 5 Drawing Sheets

OTHER PUBLICATIONS

Roy Wang et al.; "A confidence measure based moving object extraction system built for compressed domain"; IEEE International Symposium on Circuits and Systems; vol. 5; May 28, 2000 through May 31, 2001; pp. 21-24; XP010504123.

Jamrozik M.L. et al.; "A compressed domain motion video object segmentation system"; Proceedings 2002 International Conference on Image Processing, ICIP 2002; vol. 2 of 3; pp. 113-116; XP010607273.

R.V. Babu et al.; "Compressed domain motion segmentation for video object extraction"; IEEE International Conference on Acoustics Speech and Signal Processing; vol. 4; Sep. 22, 2002; pp. 4-3788-4-3791; May 13-17, 2002; XP002311161.

Stoffler N.O. et al.; "An image processing board with an MPEG processor and additional confidence calculation for fast and robust optic flow generation in real environments"; Advanced Robotics, 1997. Proceedings, 8$^{th}$ International Conference on Monterey, CA; Jul. 7-9, 1997; pp. 845-850; XP010244108.

Barron J.L. et al.; "Performance of optical flow techniques"; Proceedings of the Computer Society Conference on Computer Vision and Pattern Recognition. Champaign, IL, Jun. 15-18, 1992; New York IEEE; Jun. 15, 1992; pp. 236-242; XP010029350.

How-Lung Eng et al.; "Spatiotemporal segmentation of moving video objects over MPEG compressed domain"; Multimedia and Expo, 2000. ICME 2000. 2000 IEEE International Conference on New York, NY; Jul. 30, 2000; pp. 1531-1534; XP010512797.

* cited by examiner a) Original Image  b) Raw Vectors c) Motion Field  d) Smooth Motion Field I Picture  P Picture a) Raw LK field  b) $\lambda_1$ threshold a) Before confidence thresh.  b) After confidence thresh.

a) Before confidence thresh.  b) After confidence thresh.

a) Dense LK field  b) MPEG-2 smooth motion field a) MPEG-2 Smooth motion field  b) LK field

OPTICAL FLOW ESTIMATION METHOD

This invention relates to optical flow estimation, and, in particular, optical flow estimation in a compressed video data stream.

BACKGROUND OF THE INVENTION

One of the problems of image processing lies in distinguishing foreground objects from background images in video data. Applications in areas as diverse as video processing, video compressing or machine vision rely on effective segmentation techniques to perform their desired tasks. Motion segmentation exploits the temporal correlation of consecutive video images and detects image regions with different motion. This two dimensional motion, usually called apparent motion or optical flow, needs to be recovered from image intensity and colour information in a video sequence.

In general, depending on the target application, one can trade optimisation performance (accuracy) against computational load (efficiency). Some specific applications need very high efficiency due to real-time requirements and practical feasibility. Surveillance applications, such as a pedestrian detection system for underground train stations, are an example of a situation in which a controlled environment (fixed camera, controlled illumination) allied with cost requirements (large numbers of cameras and necessity of fast response times) is a good target for high efficiency algorithms. Such a system is likely to use one of the popular available video encoding standards that already use some form of motion estimation designed for compression purposes.

Horn and Schunck, "Determining Optical Flow", in AL Memo 572, Massachusetts Institute of Technology, 1980 defines optical flow as "the distribution of apparent velocities of movement of brightness patterns in an image". This definition assumes that all changes in the image are caused by the translation of these brightness patterns, leading to the gradient constraint equation, involving spatial and temporal gradients and an optical flow velocity.

This velocity is a two dimensional approximation of the real scene movement in the image plane that may be termed real velocity. The gradient constraint equation requires additional constraints for resolution. Horn and Schunck (above) use a global smoothness term to solve this problem, while Lucas and Kanade ("An Iterative Image Registration Technique with an Application to Stereo Vision", Proc. Of the Imaging Understanding Workshop 1981 pp 121-130) use a weighted least-squares fit of local first-order constraints assuming that image gradient is almost constant for local neighbourhoods. The Lucas Kanade method generates matrix eigenvalues, the magnitude of the eigenvalues being directly related to the strength of edges in the image and the eigenvalues being used to create a confidence map of optical flow accuracy.

A confidence map is a set of data which stores the confidence, or variance, at each pixel for the accuracy of the optical flow field.

Both of the above methods are called differential methods since they use the gradient constraint equation directly to estimate optical flow. The largest problem of such differential methods is that they cannot be applied to large motions because a good initial value is required.

U.S. Pat. No. 6,456,731 discloses an optical flow estimation method which incorporates a known hierarchically-structured Lucas Kanade method for interpolating optical flow between regions having different confidence values.

MPEG-2 video encoding allows high-quality video to be encoded, transmitted and stored and is achieved by eliminating spatial and temporal redundancy that typically occurs in video streams.

In MPEG-2 encoding, the image is divided in 16×16 areas called macroblocks, and each macroblock is divided into four 8×8 luminance blocks and eight, four or two chrominance blocks according to a selected chroma key. A discrete-cosine transform (DCT), an invertible discrete orthogonal transformation (see "Generic Coding of Moving Pictures and Associated Audio", Recommendation H.262, ISO/IEC 13818-2, Committee Draft MPEG-2), is applied to each 8×8 luminance block giving a matrix that is mostly composed of zeros (high-frequency power) and a small number of non-zero values. The quantization step that follows effectively controls compression ratios by discarding more or less information according to the value of the quantization scale. Zig-zag and Huffman coding exploit the resulting high-number of zero values and compress the image data.

Temporal redundancy is quite severe in video since consecutive images are very similar. To achieve even better compression each macroblock is compared not to its direct spatial equivalent in a previous image but to a translated version of it (to compensate for movement in the scene) that is found using a block-matching algorithm. The translation details are stored in a motion vector that refers to either a previous image or a following image depending on the picture type.

MPEG-2 encoding defines three kinds of image data: intra-coded frame data (I pictures) with only spatial compression (no motion vectors), predicted frame data (P pictures) and bi-directionally interpolated frame data (B pictures) with motion estimation.

I pictures only have intra-coded macroblocks (macroblocks without motion estimation) because they are coded without reference to other pictures. P and B pictures can also include inter-coded macroblocks (macroblocks where only the difference to the original macroblock designated by the motion vector is encoded). P pictures are coded more efficiently using motion compensated prediction from a past I or P picture and are generally used as a reference for future prediction. B pictures provide the highest degree of compression but require both past and future reference pictures for motion compensation; they are never used as references for prediction.

FIG. 1 illustrates the typical picture sequence of an MPEG-2 compressed video data stream. The organisation of the three picture types, I, B and P pictures, in a video stream is flexible, the choice being left to the encoder and being dependent on the requirements of the application. In the particular example shown the pictures are in the sequence IBBPBBP, and the arrows represent the direction in which pictures are estimated. I pictures are used to predict B and P pictures. P pictures are used to predict prior and following B pictures. B pictures are not used as references for other pictures.

U.S. Pat. No. 6,157,396 discloses a system for improving the quality of digital video using a multitude of techniques and focussing on MPEG-2 compressed video data. The system aims to enhance standard compressed MPEG-2 decoding by using a number of additional processes, including retaining groups of pictures (GOP) and the motion vector information, to aid post decompression filtering in the image reconstruction (IR) and digital output processor (DOP). The system decompresses the image but retains the motion vectors for later use in the DOP. Supplemental information, such as a layered video stream, instructional cues and image key meta data, is used to enhance the quality of the decoded image through post decompression filtering. However this system relies on decompression of the MPEG-2 compressed video data which is disadvantageous in that it tends to increase computational complexity and decrease processing speed.

It is an object of the present invention to provide fast, reasonably accurate two-dimensional motion estimation of a video scene for applications in which it is desired to avoid high computational costs and compressed digital video data is used.

It is a further object of the present invention to provide such motion estimation which closely approximates the Lucas-Kanade method of optical flow estimation, but working only with compressed video data.

SUMMARY OF THE INVENTION

According to a first aspect of the present invention there is provided an optical flow estimation method comprising the steps of obtaining encoded image data representative of an image sequence of a changing object having a motion field; extracting from said encoded image data first frame data blocks not incorporating motion vector encoding; extracting from said encoded image data second frame data blocks incorporating motion vector encoding; determining from said first frame data blocks confidence map data indicative of the edge strength within said encoded the image data and hence the accuracy of the motion field; deriving from said second frame data blocks smooth motion field data blocks in which each data block has a single motion vector and the magnitudes of the motion vectors are normalised; and updating the confidence map data on the basis of the smooth motion field data blocks to provide output data indicative of the optical flow of the image.

In one embodiment of the invention, the encoded image data is encoded in the MPEG-2 video data format. However the invention is applicable to any compressed domain representation in which motion vectors are encoded.

According to a second aspect of the present invention there is provided an optical flow estimation system utilising encoded image data representative of an image sequence of a changing object having a motion field, the system comprising first extraction means for extracting from said encoded image data first frame data blocks not incorporating motion vector encoding; second extraction means for extracting from said encoded image data second frame data blocks incorporating motion vector encoding; determination means for determining from said first frame data blocks confidence map data indicative of the edge strength within said encoded image data and hence the accuracy of the motion field; derivation means for deriving from said second frame data blocks smooth motion field data blocks in which each data block has a single motion vector and the magnitudes of the motion vectors are normalised; and updating means for updating said confidence map data on the basis of said smooth motion field data blocks to provide output data indicative of the optical flow of the image.

According to a third aspect of the present invention there is provided computer readable recording medium on which is recorded an optical flow estimation program for causing a computer to execute the following steps: extracting, from encoded image data representative of an image sequence of a changing object having a motion field, first frame data blocks not incorporating motion vector encoding; extracting from said encoded image data second frame data blocks incorporating motion vector encoding; determining from said first frame data blocks confidence map data indicative of the edge strength within said encoded image data and hence the accuracy of the motion field; deriving from said second frame data blocks smooth motion field data blocks in which each data block has a single motion vector and the magnitudes of the motion vectors are normalised; and updating the confidence map data on the basis of the smooth motion field data blocks to provide output data indicative of the optical flow of the image.

BRIEF DESCRIPTION OF THE DRAWINGS

For a better understanding of the present invention and in order to show how the same may be carried into effect, a preferred embodiment of an optical flow estimation method in accordance with the present invention will now be described, by way of example, with reference to the accompanying drawings, in which:

FIGS. 11a and 11b illustrate the effect of noise reduction on the confidence map of the scene of FIG. 5a;

FIGS. 12a and 12b show the motion field generated by the Lucas Kanade method and the preferred embodiment of the present invention respectively for the scene of FIG. 5a;

DETAILED DESCRIPTION OF THE DRAWINGS

The Lucas Kanade method of optical flow estimation noted above involves direct processing of pixel information. The preferred embodiment of the present invention to be described below closely approximates the Lucas Kanade method but working in the compressed video data domain, using only quantities related to the compressed video data.

Figure 2:
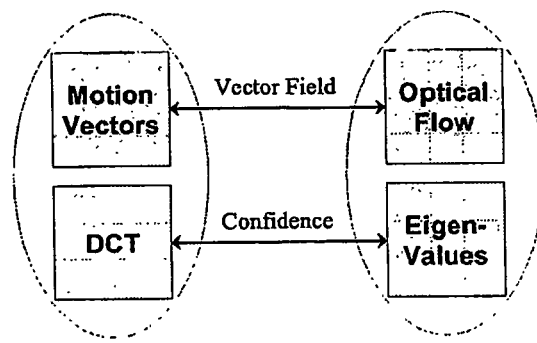
FIG. 2 is a diagram providing a comparison of the Lucas Kanade method of optical flow estimation with that of a preferred embodiment of the present invention.

A parallel between the Lucas Kanade method and that of the preferred embodiment is drawn in FIG. 2. Two tasks can be identified, namely the generation of a motion vector field with one vector per data macroblock and estimation of a confidence map for the motion vector field. Not every data macroblock has one motion vector. Some data macroblocks have none (intra-coded blocks) and some have two (interpolated blocks in B pictures). Therefore a basis is needed upon which a smooth motion field based on MPEG-2 motion vectors can be generated.

The obtained motion vector field, like the optical flow field, needs some sort of confidence measure for each vector to be meaningful. Areas of the motion vector field with strong edges exhibit better correlation with real motion than textureless ones.

Figure 3:
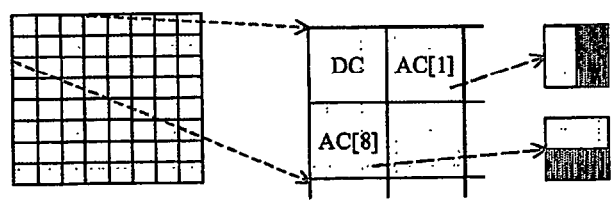
FIG. 3 illustrates the structure of the AC[1] and AC[8] coefficients within a DCT block of the encoded video data stream.

A DCT block is the set of 64 DCT coefficients which result from application of a DCT to a data macroblock. A DCT coefficient is the amplitude of a specific cosine basis function, while an AC coefficient is a DCT coefficient for which the frequency in one or both of the dimensions is non-zero. DCT coefficients of an intra-coded data macroblock have a measure of edge strength in the AC coefficients. The AC[1] and AC[8] coefficients within such a macroblock, illustrated in FIG. 3, measure the strength and direction of an edge within the 8×8 luminance block, and, drawing a parallel to the eigenvalues of the Lucas Kanade method, it is possible to use these two coefficients to obtain a set of confidence measures for the MPEG-2 compressed video data stream.

The AC[1] and AC[8] coefficients may be considered approximations to the average spatial gradients over a DCT data block. Let $f(x,y)$ be the 8×8 image block and $F(u,v)$ be the block's DCT. The image can be reconstructed using the inverse DCT:

$$f(x, y) = \sum_{u,v} \frac{C_u}{2} \frac{C_v}{2} F(u, v) \cos\left(\frac{(2x+1)u\pi}{16}\right) \cos\left(\frac{(2y+1)v\pi}{16}\right)$$

This reconstruction can be used for continuous values of x and y, not just integers, and therefore the spatial gradient $f_x(x,y)$ can be obtained by differentiating:

$$f_x(x, y) = -\sum_{u,v} \frac{u\pi}{8} \frac{C_u}{2} \frac{C_v}{2} F(u, v) \sin\left(\frac{(2x+1)u\pi}{16}\right) \cos\left(\frac{(2y+1)v\pi}{16}\right)$$

A similar expression for spatial gradient $f_y(x,y)$ can also be obtained. An average gradient over the complete image block can then be calculated as a weighted sum:

$$\bar{f_x} = -\sum_{x,y} w(x, y) \sum_{u,v} \frac{u\pi}{8} \frac{C_u}{2} \frac{C_v}{2} F(u, v) \sin\left(\frac{(2x+1)u\pi}{16}\right) \cos\left(\frac{(2y+1)v\pi}{16}\right)$$

where $w(x,y)$ is some spatial weighting function. A popular weighting function to choose is a Gaussian. However, by choosing the weighting function:

$$w(x, y) = \sin\left(\frac{(2x+1)\pi}{16}\right)$$

for the x direction, the average gradient expression simplifies as follows:

$$\bar{f_x} = -\sum_{x,y} \sin\left(\frac{(2x+1)\pi}{16}\right) \sum_{u,v} \frac{u\pi}{8} \frac{C_u}{2} \frac{C_v}{2} F(u, v) \sin\left(\frac{(2x+1)u\pi}{16}\right)$$
$$\cos\left(\frac{(2y+1)v\pi}{16}\right)$$
$$= -\sum_{u,v} \frac{u\pi}{8} \frac{C_u}{2} \frac{C_v}{2} F(u, v) \sum_x \sin\left(\frac{(2x+1)\pi}{16}\right) \sin\left(\frac{(2x+1)u\pi}{16}\right)$$
$$\sum_y \cos\left(\frac{(2y+1)v\pi}{16}\right)$$
$$= -\pi C_1 C_0 F(1, 0) = -\frac{\pi}{\sqrt{2}} F(1, 0)$$

where $C_u$ and $C_v$ being functions of u and v that equal $1/\sqrt{2}$ if u or v are 0 and $C_u$ and 1 if u or v have any other value. $C_0$ and $C_1$ are functions of u where u=0 and u=1 respectively.

Similar analysis can be performed for $\bar{f_y}$. Thus with appropriate weighting the AC[1] (F(1,0)) and AC[8] (F(0,1)) coefficients can be interpreted as negative weighted average gradients over the DCT data block.

To summarise the above equations, the coefficients AC[1] and AC[8] approximate to the average spatial gradient within a block:

$$AC[1] \propto -\bar{f_x}$$

$$AC[8] \propto -\bar{f_y}.$$

Instead of constructing a matrix for the gradients at each pixel and then averaging, as in the Lucas Kanade method, the preferred embodiment of the present invention uses the steps of averaging the gradients (i.e. using the DCT coefficients) and then constructing a single matrix M':

$$M' = \begin{bmatrix} -AC[1] \\ -AC[8] \end{bmatrix} [-AC[1] \quad -AC[8]].$$

This matrix will, by definition, be singular with only one significant eigenvalue:

$$\lambda_1' = AC[1]^2 + AC[8]^2$$

which gives a measure of the confidence of the motion vector in the direction of the eigenvector:

$$\bar{e}_1' = \begin{bmatrix} -AC[1] \\ -AC[8] \end{bmatrix}.$$

A strong eigenvalue signals a large image gradient, e.g. an edge, in this block and the associated eigenvector will be normal to the edge's direction. Only the magnitude of $\lambda_1$ has been used as a confidence measure, but the difference between the direction of the motion vector and $e_1$ could also be analyzed.

M' can be related to the corresponding Lucas Kanade matrix $\overline{M}$ to show that the resulting confidence estimates are inherently conservative. The details of this are given in Appendix A.

Figure 4:
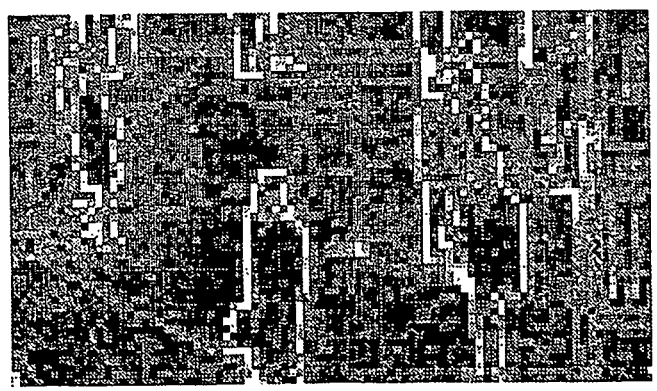
FIG. 4 shows a confidence map.

An MPEG-2 compressed video data stream has a variable number of DCT blocks for each macroblock that varies with the chroma quantization encoding parameter. Only the luminance DCT blocks are used in this embodiment, because there are always four per data macroblock (unlike the chrominance blocks that can have two, four or eight). Another reason is that the standard Lucas Kanade method only uses luminance values, so that, since the preferred embodiment attempts to approximate it, it should use only luminance as well. FIG. 4 shows an example of a confidence map, generated from the AC[1] and AC[8] coefficients, of the form $AC[1]^2+AC[8]^2$, and its correlation with edge strength.

As previously noted, not every data macroblock has one associated motion vector. In order to obtain a smooth motion field, a number of rules are implemented as follows:

1) Macroblocks with no motion vector have the same movement as in the previous image.

2) When a macroblock has two motion vectors, the one pointing back is reversed and added to the one pointing forward.

3) Motion vector magnitude is normalized (motion vectors in P pictures span three images but this does not happen with motion vectors in B pictures, so that scaling is required).

4) Skipped macroblocks in I-pictures have no movement while in P pictures they have movement similar to the previous block.

Figure 5:
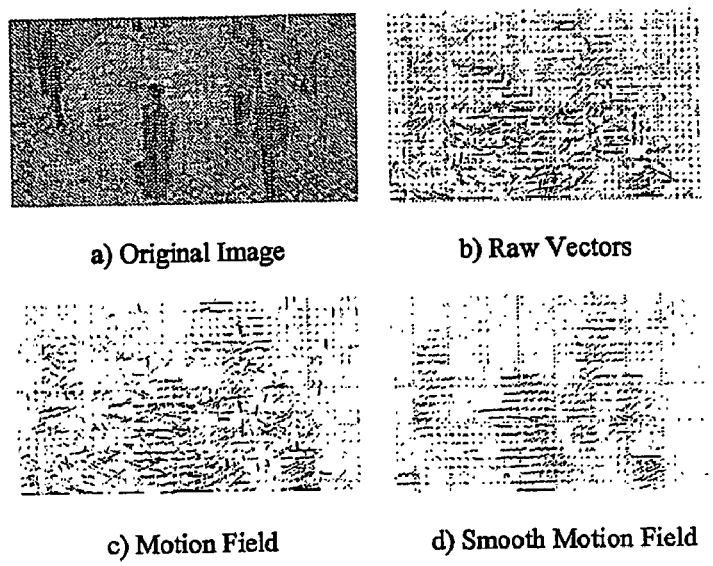
FIGS. 5a to 5d illustrate the steps for obtaining a smooth motion field in accordance with a preferred embodiment of the present invention.

Applying these rules removes the dependency on specific MPEG-2 characteristics, such as picture and macroblock type, and creates a motion field with one vector per macroblock with standardized magnitude. A spatial median filter is then applied to remove isolated vectors that have a low probability of reflecting real movement in the image. FIGS. 5a and 5b illustrate some stages of this process, FIG. 5a showing the original image, and FIG. 5b showing the raw vectors extracted from the data macroblocks of the compressed video data stream. FIG. 5c shows the motion field after application of the above rules, and FIG. 5d shows the smoothed motion field.

Figure 1:
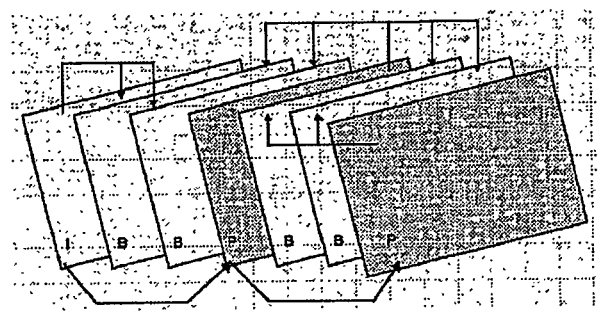
FIG. 1 illustrates a typical image sequence of an MPEG-2 encoded video data stream.
Figure 6:
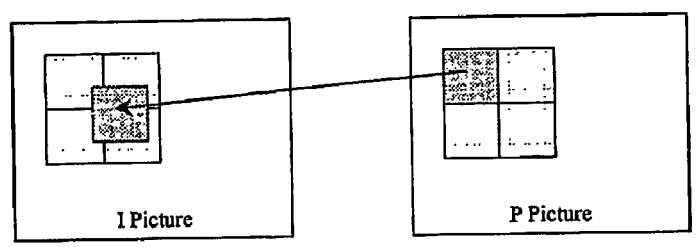
FIG. 6 is a diagram illustrating the basis of a confidence map update step in such an embodiment.
Figure 7:
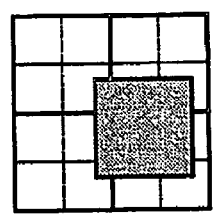
FIG. 7 is a diagram illustrating a typical scenario where the new confidence map is a weighted average of the four associated DCT blocks in the I image.

Since P and B pictures transmit mostly inter-coded blocks, the confidence map is only fully-defined for I pictures that typically only occur every 12 pictures. The typical picture sequence of FIG. 1 illustrates this. A confidence map update step is required and the preferred embodiment exploits the fact that, even if the new exact confidence of a predicted data macroblock is unknown, the confidence of the original 16×16 area that the corresponding motion vector points at may be estimated. FIG. 6 illustrates how an inter-coded macroblock (in this case from a P picture) relates to a corresponding I picture confidence map. Since motion vectors in MPEG-2 compressed video data have half-pixel accuracy, they rarely point to the top-left corner of a DCT data block, so that interpolation is required. The typical scenario will be that the new confidence is a weighted average of four DCT blocks. FIG. 7 shows how DCT blocks may be used to estimate the confidence of an error block.

There are two obvious problems that can arise from such an approach, namely excessive averaging and error propagation. In fact, every confidence map update step involves interpolating new confidences and the confidence map is only reset on I pictures that occur every 12 pictures in a typical IBBPBBPBBPBB sequence. In practice, this problem is not that serious if adequate measures are taken. An obvious measure is that updates should be kept to a minimum in order to avoid excessive blurring of the confidence map. In fact, an update is only necessary when a vector is larger than half a DCT data block, if a vector is smaller than this there is a low probability that that edge has moved significantly. Also, since motion vectors of a P picture only refer to the previous I or P picture, there is a maximum of three update steps, making error propagation less serious. Confidence map updating in B pictures may depend on the magnitude of motion present in the compressed video data sequence.

Areas of the image from which edges have moved are unreliable, so that either new edges move to these areas or they are marked with zero confidence. This happens when a moving object uncovers unknown background, possibly generating random motion that, since it has zero confidence, is ignored.

Figure 16:
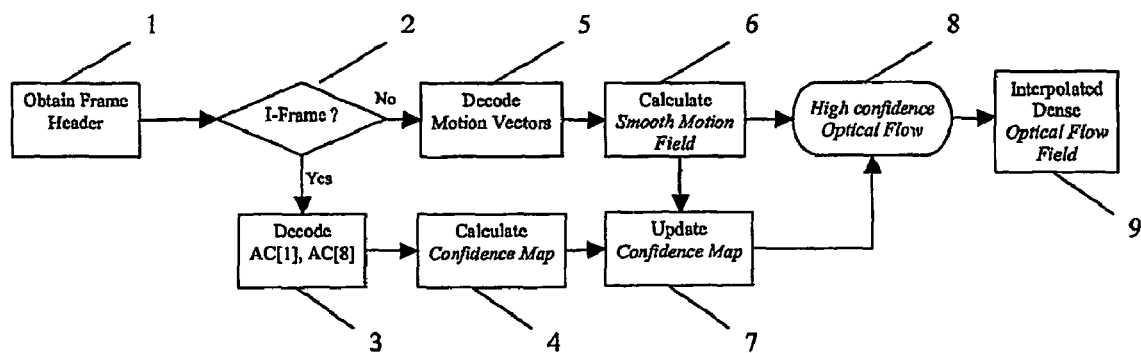
FIG. 16 is a flow diagram illustrating the steps of the method of the preferred embodiment of the present invention.

The method of the preferred embodiment will now be described with reference to FIG. 16 as a sequence of steps that may be carried out within a digital processor under the control of a computer program. Encoded image data representative of an image of a changing object, preferably in an MPEG-2 encoded format, is supplied to the digital processor from a video camera, for example. Step 1 corresponds to obtaining a frame header from the encoded image data, which, for an MPEG-2 data stream, will comprise information describing whether the frame is an I, B or P picture.

At step 2 a decision is made as to whether or not the encoded video data frame incorporates motion vector encoding. Pictures used exclusively for reference purposes do not contain motion vector encoding, whereas predicted pictures contain motion vector information describing how to obtain the predicted picture from a reference picture. When the encoded video data is MPEG-2 encoded data, I pictures have no motion vector encoding, whereas both B and P pictures do incorporate motion vector encoding. The decision is therefore made on the basis of information extracted from the frame header.

If the decision made at step 2 is that the encoded image data does not incorporate motion vector encoding then, at step 3, first frame data blocks not incorporating motion vector encoding are extracted. In the case of MPEG-2 encoded data, this step comprises extracting macroblocks of the I pictures yielding DCT coefficients. AC coefficients AC[1] and AC[8] are a subset of the DCT coefficients, and provide information on the strength and direction of edges in the real image.

At step 4 the encoded image data not containing motion vector encoding is used to generate a confidence map indicative of the edge strength within the image data and hence the accuracy of the motion field. The AC[1] and AC[8] coefficients are used to create the confidence map for MPEG-2 encoded data.

If the decision made at step 2 is that the encoded image data does incorporate motion vector encoding then, at step 5, second frame data blocks incorporating motion vector encoding are extracted. In the case of MPEG-2 encoded data, this step comprises extracting macroblocks of the B and P pictures.

At step 6, the second frame data blocks are used to derive smooth motion field data blocks in which each data block has a single motion vector and the magnitudes of the motion vectors are normalised. This is achieved by application of a set of rules which compensate for not every macroblock having one motion vector or motion vectors of a normalised magnitude. As noted above, such rules remove the dependency on the specific format in which the image data is encoded.

The confidence map data determined in step 4 above is updated at step 7 on the basis of the smooth motion field data blocks derived in step 6. The motion vectors relate regions of the first frame data blocks to regions of the second frame data blocks. This provides a function taking the confidence map from the first frame onto the second frame. Because the motion vectors typically do not exactly map a DCT block in an I image to a DCT block in a P or B image it is necessary to interpolate across the confidence map as depicted in FIG. 6. In one embodiment the new confidence map is a weighted average of the confidence values for the neighbouring 4 DCT blocks as shown in FIG. 7.

Steps 4 and 7 thereby together provide an updated confidence map for the smoothed motion vectors, leading to an estimate of the high confidence optical flow within the image, as performed in step 8.

To obtain a dense optical flow field the high confidence optical flow data can be spatially interpolated as performed in step 9.

Both the motion vector field and the associated confidence map are accordingly estimated. Magnitude and confidence map thresholding can be applied to remove the majority of the noisy vectors, removing glow effects of lights on shiny surfaces and shadows.

Such data is somewhat sensitive to a fixed threshold and accordingly a motion segmentation algorithm using the motion estimation of the preferred embodiment could use more flexible decision methods (adaptive thresholding, multi-step thresholding, probabilistic models, etc.). For the above-mentioned pedestrian detection scenario a fixed threshold is sufficient, and accordingly the examples referred to below use this for simplicity of visualization of the results.

Figure 8:
FIGS. 8a and 8b illustrate the effects of thresholding on a scene with no real motion.
Figure 9:
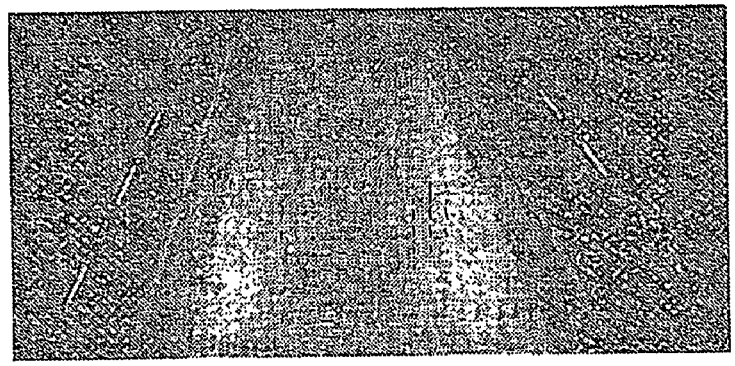
FIG. 9 illustrates the smooth motion field of the scene of FIGS. 8a and 8b as provided by this embodiment.
Figure 10:
FIGS. 10a and 10b show the effect of noise reduction on the confidence map of the scene of FIGS. 8a and 8b.
Figure 11:

Using the scene of FIGS. 8a and 8b by way of a first example, the effect of using confidence thresholding to remove illumination noise and increase the accuracy of the motion estimation can be observed. In this specific scene, bright lights and a shiny pavement generate a lot of apparent motion that does not reflect real motion (FIG. 9). The majority of the illumination noise is removed except for the noise on the handrails where there are strong edges and a lot of apparent motion. FIGS. 10a and 10b show the noise reduction effect of the confidence map before and after thresholding respectively. Such noise can be dealt with by a subsequent motion segmentation algorithm. A second example is shown in FIGS. 11a and 11b with the thresholded low-resolution motion field (16×16 blocks) in a scene with moving objects being shown before and after confidence thresholding in FIGS. 11a and 11b respectively.

Figure 12:
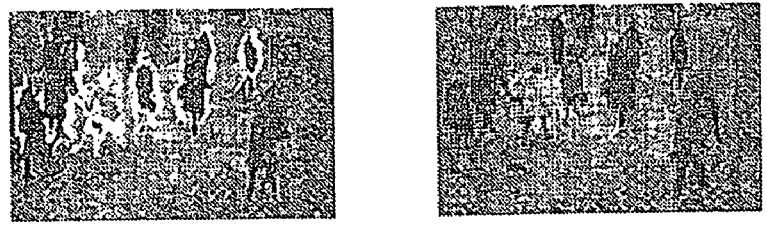
Figure 13A:
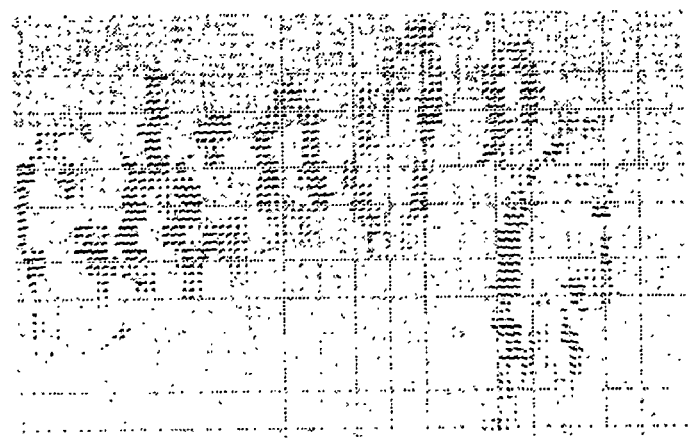
FIGS. 13a and 13b show the motion fields of FIGS. 12a and 12b without the original image.
Figure 13B:
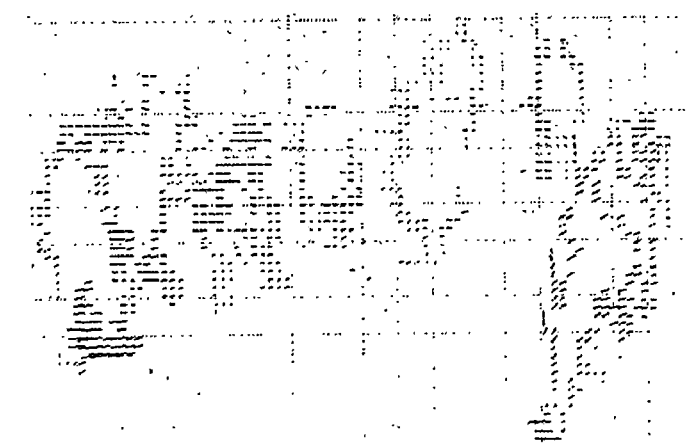
Figure 14A:
FIGS. 14a and 14b show further aspects of the motion fields of FIGS. 12a and 12b without the original image.
Figure 14B:

Motion fields generated according to the Lucas Kanade method provide dense motion maps in that a motion vector is provided for every pixel. This can be seen in FIG. 12a where pixels with vectors pointing right are shown in white and vectors pointing left are show in grey for the sub-sampled Lucas Kanade motion field. FIG. 12b shows the same scene, with the MPEG-2 smooth motion field. For ease of comparison FIG. 13a shows this Lucas Kanade motion field sub-sampled to the same resolution as the proposed scheme, and FIG. 13b shows how successfully the smooth motion field of the present invention approximates it. FIGS. 14a and 14b show both motion fields corresponding to another situation (that depicted in FIG. 5a), these figures showing the sub-sampled Lucas Kanade and MPEG-2 smooth motion fields respectively. A close match may be observed between the Lucas Kanade motion field and that of the preferred embodiment of the present invention.

Figure 15:
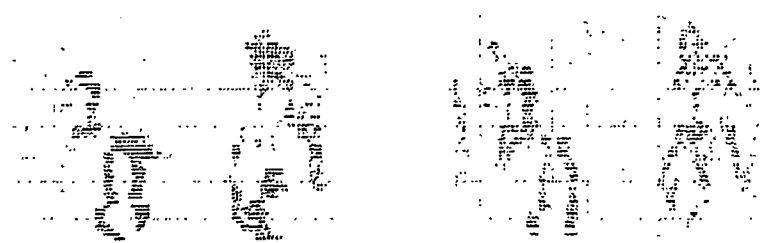
FIGS. 15a and 15b illustrate the effects of blurring caused by three confidence update steps applied to the motion fields of FIGS. 14a and 14b respectively.

An example of the blurring effect caused by the confidence map update step is shown in FIGS. 15a and 15b. The most severe case is presented (after three update steps) to show that, even with some blurring, the approximation is still quite accurate. Some definition is lost in the shape of the object, but most of the motion is still correct. FIG. 15a shows the MPEG-2 smooth motion field, and FIG. 15b the Lucas Kanade motion field.

The approximation to the Lucas Kanade method of optical flow estimation provided by the preferred embodiment of the present invention is obtained at very low computational cost. All of the operations are simple and are applied to a small data set (44*30 macroblocks, 44*30*4 DCT blocks). This, allied with minimal MPEG-2 decoding, easily allows frame rates of over 25 images per second with unoptimised code. A rough comparison with Lucas Kanade method code shows that the algorithm of the preferred embodiment is approximately 50 times faster. With appropriate optimization, faster performance is possible. Given its low complexity, the method of the present invention may be implemented in a low cost real time optical flow estimator based around an inexpensive digital signal processing chipset.

Although the smoothing effect of the weighted averaging is small, it is possible that it may be reduced even further. Object segmentation is likely to improve it, reducing blurring significantly and allowing more robust motion estimation. A more specific improvement would be to use low-resolution DC images for static camera applications where a background subtraction technique, allied with the motion estimation of the present invention, might be used for robust foreground object detection and tracking.

The present invention provides a method for estimating optical flow, particularly optical flow as estimated by the well-known Lucas Kanade method, using only compressed video data. It will be appreciated by the person skilled in the art that various modifications may be made to the above described embodiments without departing from the scope of the present invention.

Appendix A

The Lucas Kanade and present invention matrices can be approximately characterized as follows:

$$\overline{M} \approx E\left\{ \begin{bmatrix} f_x \\ f_y \end{bmatrix} [f_x \ f_y] \right\}$$

and $$M' \approx \begin{bmatrix} E\{f_x\} \\ E\{f_y\} \end{bmatrix} [E\{f_x\} \ E\{f_y\}]$$

respectively, where $E\{o\}$ represents expectation over the image pixels and the scale difference in M' has been ignored. It then follows from Jensen's inequality (see Cover and Thomas, "Elements of Information Theory" 1991, Wiley & Sons.) that for any direction w:

$$w^T M' w \leq w^T \overline{M} w$$

where $(w^T \overline{M} w)^{-1}$ represents the variance of the optical flow estimate in the direction w for the Lucas Kanade method. Thus the singular matrix M' always gives larger variance estimates, so that it is an inherently conservative confidence measure.

The invention claimed is:

1. An optical flow estimation method comprising:
obtaining encoded image data representative of an image sequence of a changing object having a motion field;
extracting from said encoded image data first frame data blocks not incorporating motion vector encoding;
extracting from said encoded image data second frame data blocks incorporating motion vector encoding;
determining from said first frame data blocks confidence map data indicative of the edge strength within said encoded image data and hence the accuracy of the motion field;
deriving from said second frame data blocks smooth motion field data blocks in which each data block has a single motion vector and the magnitudes of the motion vectors are normalised; and
updating the confidence map data on the basis of the smooth motion field data blocks to provide output data indicative of the optical flow of the image.

2. The method according to claim 1, wherein the encoded image data is MPEG-2 encoded video data.

3. The method according to claim 1, wherein the first frame data blocks are representative of luminance data of said encoded image data.

4. The method according to claim 3, wherein the first frame data blocks extracted from said encoded image data are representative of a discrete cosine transform (DCT) of the luminance data.

5. The method according to claim 4, wherein the confidence map data is determined from weighted AC coefficients of the discrete cosine transform (DCT) representative of the intensity gradients in mutually transverse directions.

6. The method according to claim 2, wherein the confidence map data is determined from the weighted AC[1] and AC[8] coefficients of the MPEG-2 encoded video data representative of the intensity gradients in mutually transverse directions.

7. The method according to claim 5, wherein the confidence map data is determined from the sum of the squares of the weighted AC coefficients of the discrete cosine transform (DCT) representative of the intensity gradients in mutually transverse directions.

8. The method according to claim 1, wherein the smooth motion field data blocks are derived from said second frame data blocks by a transformation in which, where a second frame data block has no motion vector, the corresponding field data block is ascribed the same motion vector as the immediately preceding field data block.

9. The method according to claim 1, wherein the smooth motion field data blocks are derived from said second frame data blocks by a transformation in which, where a second frame data block has two motion vectors pointing in opposite directions, the corresponding field data block is ascribed a motion vector in one of the directions having a magnitude corresponding to the sum of the magnitudes of said two motion vectors pointing in opposite directions.

10. The method according to claim 1, wherein the smooth motion field data blocks are derived from said second frame data blocks using spatial filtering to suppress isolated smooth motion field data blocks having a low probability of reflecting real movement.

11. The method according to claim 1, wherein the confidence map data is updated when the vector of a smooth motion field data block has a magnitude exceeding a certain threshold.

12. An optical flow estimation system utilising encoded image data representative of an image sequence of a changing object having a motion field, the system comprising:
first extraction means for extracting from said encoded image data first frame data blocks not incorporating motion vector encoding;
second extraction means for extracting from said encoded image data second frame data blocks incorporating motion vector encoding;
determination means for determining from said first frame data blocks confidence map data indicative of the edge strength within said encoded image data and hence the accuracy of the motion field;
derivation means for deriving from said second frame data blocks smooth motion field data blocks in which each data block has a single motion vector and the magnitudes of the motion vectors are normalised; and
updating means for updating said confidence map data on the basis of said smooth motion field data blocks to provide output data indicative of the optical flow of the image.

13. The system according to claim 12, further adapted to receive MPEG-2 encoded video data.

14. The system according to claim 12, wherein the first frame data blocks are representative of luminance data of said encoded image data.

15. The system according to claim 14, wherein the first extraction means is arranged to extract the first frame data blocks such that the first frame data blocks are representative of a discrete cosine transform (DCT) of the luminance data.

16. The system according to claim 15, wherein the determination means is arranged to determine the confidence map data from weighted AC coefficients of the discrete cosine transform (DCT) representative of the intensity gradients in mutually transverse directions.

17. The system according to claim 13, wherein the determination means is arranged to determine the confidence map data from the weighted AC[1] and AC[8] coefficients of the MPEG-2 encoded video data representative of the intensity gradients in mutually transverse directions.

18. The system according to claim 16, wherein the determination means is arranged to determine the confidence map data from the sum of the squares of the weighted AC coefficients of the discrete cosine transform (DCT) representative of the intensity gradients in mutually transverse directions.

19. The system according to claim 12, wherein the derivation means is arranged to derive the smooth motion field data blocks from said second frame data blocks by a transformation in which, where a second frame data block has no motion vector, the corresponding field data block is ascribed the same motion vector as the immediately preceding field data block.

20. The system according to claim 12, wherein the derivation means is arranged to derive the smooth motion field data blocks from said second frame data blocks by a transformation in which, where a second frame data block has two motion vectors pointing in opposite directions, the corresponding field data block is ascribed a motion vector in one of the directions having a magnitude corresponding to the sum of the magnitudes of said two motion vectors pointing in opposite directions.

21. The system according to claim 12, wherein the derivation means is arranged to derive the smooth motion field data blocks from said second frame data blocks using spatial filtering to suppress isolated smooth motion field data blocks having a low probability of reflecting real movement.

22. The system according to claim 12, incorporating a digital processor.

23. A tangible computer readable storage medium having computer readable instructions stored thereon, the instructions comprising:

instructions for extracting, from encoded image data representative of an image sequence of a changing object having a motion field, first frame data blocks not incorporating motion vector encoding;

instructions for extracting from said encoded image data second frame data blocks incorporating motion vector encoding;

instructions for determining from said first frame data blocks confidence map data indicative of the edge strength within said encoded image data and hence the accuracy of the motion field;

instructions for deriving from said second frame data blocks smooth motion field data blocks in which each data block has a single motion vector and the magnitudes of the motion vectors are normalised; and instructions for updating the confidence map data on the basis of the smooth motion field data blocks to provide output data indicative of the optical flow of the image.

* * * * *